Aug. 18, 1925.
H. C. FLACKE, SR
1,550,529
WATER HEATER
Filed Oct. 4, 1922
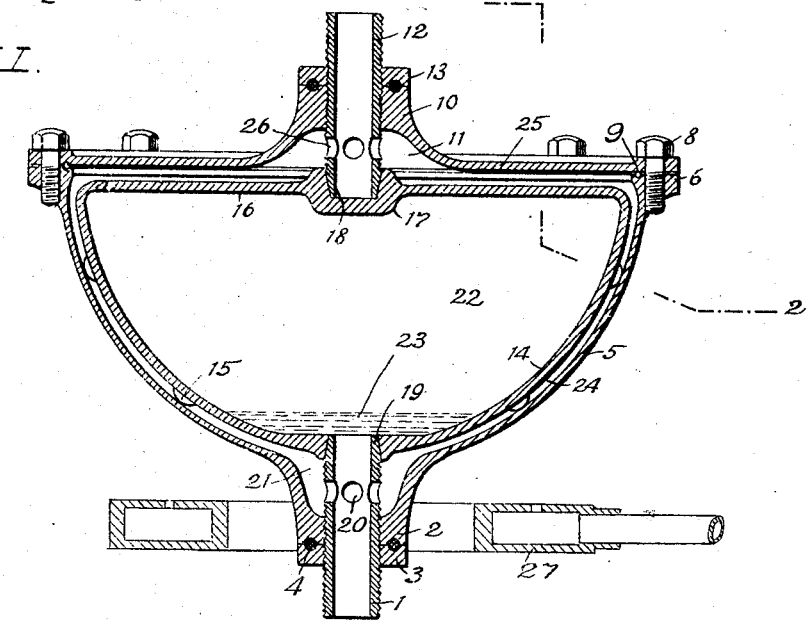
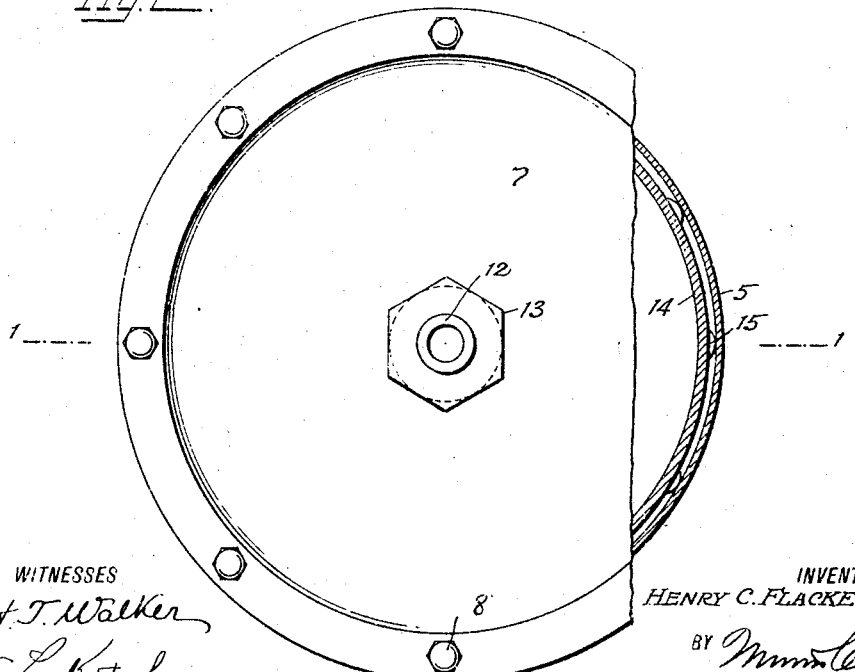
WITNESSES
H. T. Walker
A. L. Kitchin
INVENTOR
HENRY C. FLACKE SR.
BY
ATTORNEYS Patented Aug. 18, 1925.

1,550,529

UNITED STATES PATENT OFFICE.

HENRY C. FLACKE, SR., OF BUFFALO, NEW YORK, ASSIGNOR OF ONE-HALF TO HARRY W. POERNER, OF BUFFALO, NEW YORK.

WATER HEATER.

Application filed October 4, 1922. Serial No. 592,356.

*To all whom it may concern:*

Be it known that I, HENRY C. FLACKE, Sr., a citizen of the United States, and a resident of Buffalo, in the county of Erie and State of New York, have invented a new and Improved Water Heater, of which the following is a full, clear, and exact description.

This invention relates to water heaters and has for an object to provide an improved construction which will quickly heat a given supply of water.

Another object of the invention is to provide a water heater designed to heat the water during its passage from the water main or other supply to its discharge point, the arrangement being such that the water at one point of its travel is spread out in a thin sheet and while in that condition is subjected to the action of heat.

Another object of the invention is to provide a heating element to be inserted into a pipe formed as a double walled bowl for spreading the water without retarding its flow in order that heat may be applied while the water is spread.

In the accompanying drawing—

Figure 1 is a longitudinal vertical section through Figure 2 approximately on line 1—1, the same disclosing an embodiment of the invention.

Figure 2 is a sectional view of Figure 1 approximately on line 2—2.

Referring to the accompanying drawing by numerals, 1 indicates an externally threaded tube which is adapted to be secured to the water main or other suitable water supply, said tube being threaded into the base 2 and locked in place by a suitable lock nut 3. A packing 4 is arranged between the lock nut 3 and the base 2. The base 2 extends upwardly a short distance substantially as a tube and then flares for forming the outer shell 5 of the bowl 6. The shell 5 has a top 7 mounted thereon and rigidly secured thereto by suitable screws 8. A suitable packing 9 is provided for causing the connection to be water-tight. The cover 7 merges into a hub section 10 having a space or chamber 11 through which the externally threaded pipe 12 extends, said pipe being threaded into the hub 10 and locked in position by a suitable lock nut 13.

Arranged interiorly of the casing 5 is an inner member or displacer 14 which substantially fills the casing 5 but is spaced a very short distance therefrom by thickened or raised portions 15 preferably formed on the exterior of the displacer 14. The displacer 14 is not only provided with a body which parallels the walls of the casing 5 but also with a top section 16 paralleling the cover 7. The top section 16 is provided with an enlargement 17 having a tapering socket into which the tapering end 18 of the tube 12 is forced, the fit being comparatively tight so as to assist in centering and holding in position the displacer 14. At the bottom the displacer 14 is provided with a tapering aperture for receiving the tapering end 19 of the tube 1 which centers the displacer at the bottom. The tube 1 is open at both ends and is provided with a plurality of apertures 20 opposite the chamber 21 formed in the base 2 so that water passing upwardly through the tube 1 may pass into the chamber 21 and also into the interior of the displacer 14, namely, into chamber 22. This chamber is normally filled with air at atmospheric pressure whereby when the water enters, this air will be compressed according to the pressure of the water so that the water will usually not rise above the line 23.

The pipe 12 is intended to be connected to a distributing spigot or other distributing member and when this member is open so that the water can flow, water will pass through the apertures 20 into chamber 21, through the restricted space or chamber 24 to the restricted space or chamber 25 between the top 7 and section 16 and from thence to the chamber 11 and out the apertures 26 in the tube 12. From the tube 12 the water passes to the distributing member in a heated condition provided the heater 27 is operating. The heater 27 may be of any desired kind and is intended to apply heat to the casing 5 exteriorly thereof. As there is only a thin sheet of water passing through chamber 24, the water will quickly absorb the heat units from the heater and the temperature will thereby be quickly raised so that the water will be heated to a comparatively high temperature as it freely flows through the device. It is intended to make the chamber 24 of such a capacity as to permit the free flow of water through the pipes 1 and 12 at the usual pressure. It will be noted that the heater may be inserted into any water system as long as the capacity of the chamber 24 is the same as the pipes 1 and 12 and there will be no interference to the flow of water, the heater may be used or not used as desired so that when not used the ordinary supply of cold water will be provided without interference and when used the same or any desired quantity within the capacity of pipe 1 may be heated. It will be seen that the water is substantially instantaneously heated when the burner 27 is lighted and heated water is continuously supplied as long as the burner is lighted.

What I claim is:—

1. A water heater, comprising a casing, a hollow displacer in the casing and spaced therefrom, an inlet pipe communicating with the interior of the displacer and with the space between the displacer and casing, an outlet pipe communicating with the casing only, said inlet and outlet pipes both secured to the displacer and centering the same in the casing.

2. In a water heater of the character described, a casing formed in the shape of a bowl and having an inlet at the bottom, a cover for said casing having an outlet, a displacer arranged in said bowl and almost filling the bowl, said displacer being provided with enlargements for spacing the same from the bowl, and inlet and outlet members connected with the casing and with the cover respectively engaging the displacer for holding the same in a set position.

HENRY C. FLACKE, Sr.